United States Patent
Itao

(10) Patent No.: US 8,879,049 B2
(45) Date of Patent: Nov. 4, 2014

(54) OBJECT SENSING DEVICE

(71) Applicant: Daisuke Itao, Aichi (JP)

(72) Inventor: Daisuke Itao, Aichi (JP)

(73) Assignee: Omron Automotive Electronics Co., Ltd., Aichi (JP)

( * ) Notice: Subject to any disclaimer, the term of this patent is extended or adjusted under 35 U.S.C. 154(b) by 71 days.

(21) Appl. No.: 13/681,833

(22) Filed: Nov. 20, 2012

(65) Prior Publication Data

US 2013/0135142 A1 May 30, 2013

(30) Foreign Application Priority Data

Nov. 24, 2011 (JP) ................................ 2011-255677

(51) Int. Cl.
*G01S 13/95* (2006.01)
*G01S 17/95* (2006.01)
*G01S 17/93* (2006.01)
*G01S 7/497* (2006.01)

(52) U.S. Cl.
CPC .................. *G01S 13/95* (2013.01); *G01S 17/95* (2013.01); *G01S 17/936* (2013.01); *G01S 7/497* (2013.01)
USPC .......... 356/5.01; 356/3.01; 356/4.01; 356/5.1

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

2011/0285982 A1* 11/2011 Breed .......................... 356/4.01
2012/0314069 A1* 12/2012 Taylor .......................... 348/148

FOREIGN PATENT DOCUMENTS

JP              10-329653 A      12/1998

* cited by examiner

*Primary Examiner* — Luke Ratcliffe
(74) *Attorney, Agent, or Firm* — Osha Liang LLP

(57) ABSTRACT

An object sensing device has a radiation part that radiates an exploring wave forward, a sensing part having a first sensing element and a second sensing element, wherein the first sensing element and the second sensing element sense a reflected wave of the exploring wave radiated by the radiation part; and a determination part. The determination part determines a rainfall state ahead based on an intensity of the reflected wave sensed by the first sensing element. The determination part determines existence or non-existence of an object positioned forward based on an intensity of the reflected wave sensed by the second sensing element. A visual-field restricting member is disposed in front of the first sensing element. The visual-field restricting member causes a visual field, in which the first sensing element senses the reflected wave, to differ from a visual field, in which the second sensing element senses the reflected wave.

4 Claims, 4 Drawing Sheets

ACCEPTANCE LIGHT AMOUNT

ACCEPTANCE LIGHT AMOUNT

ACCEPTANCE LIGHT AMOUNT

OBJECT SENSING DEVICE

BACKGROUND OF THE INVENTION

1. Technical Field

The present invention relates to an object sensing device, which radiates a laser beam and the like forward as an exploring wave and senses a reflected wave of the laser beam to sense an object positioned ahead.

2. Related Art

In some conventional radar devices mounted to a vehicle, exploring waves, such as a laser beam and a radio wave, are radiated in front of an own vehicle, a reflected wave of the exploring wave is sensed to sense objects, such as a car ahead, which are positioned in front of the own vehicle, and a distance to the sensed object is measured. A sensing result of the radar device can be applied to vehicle running control, such as Adaptive Cruise Control (ACC) in which the distance to the car ahead is kept constant and Low Speed Following (LSF) during backup (during a low speed). The radar device can also be applied to a pre-crush safety system that brakes the own vehicle to reduce a damage at the time of a collision when sensing the car ahead or a stopped object, which is positioned in front of the own vehicle and hardly avoids the collision with the own vehicle.

In some radar devices, a raindrop sensing function of determining a rainfall state, which can be used in automatic control of a wiper of the vehicle, is integrally configured (for example, see Japanese Unexamined Patent Publication No. 10-329653). The radar device of Japanese Unexamined Patent Publication No. 10-329653 includes a light receiving element (stain sensing PD) and a light receiving element (ranging PD). The stain sensing PD receives light randomly reflected from a light projecting/light receiving surface (a transmission window made of glass or synthetic resin) through which a laser beam radiated forward is transmitted. The ranging PD receives light, which is transmitted through the light projecting/light receiving surface and reflected by the object positioned forward. In each predetermined period (for example, ten minutes), the radar device of Japanese Unexamined Patent Publication No. 10-329653 repeats processing of sensing a situation in which the raindrop adheres to the light projecting/light receiving surface, namely, rainfall amount to sense the rainfall state based on a change in light receiving amount of the stain sensing PD. The radar device of Japanese Unexamined Patent Publication No. 10-329653 also senses the object positioned forward and the distance to the object by receiving the reflected light using the ranging PD.

SUMMARY

However, a conventional radar device may not accurately sense the rainfall state unless the stain sensing PD sufficiently suppresses the reception of the light reflected from the object positioned forward. That is, in order to improve the sensing accuracy of the rainfall state in the radar device, the stain sensing PD may reduce the reception of the light reflected from the object and the like positioned forward.

One or more embodiments of the present invention improves the sensing accuracy of the rainfall state by reducing the influence of the reception of the light reflected from the object ahead, in the object sensing device having both the function of sensing the object positioned forward and the function of sensing the rainfall state.

In accordance with one or more embodiments of the present invention, an object sensing device includes: an radiation part that radiates an exploring wave forward; a sensing part that includes a first sensing element and a second sensing element, the first sensing element and the second sensing element sensing reflected wave of the exploring wave radiated by the radiation part; and a determination part that determines a rainfall state ahead based on an intensity of the reflected wave sensed by the first sensing element, and determines existence or non-existence of an object positioned forward based on an intensity of the reflected wave sensed by the second sensing element, wherein a visual-field restricting member is disposed in front of the first sensing element, the visual-field restricting member causing a visual field, in which the first sensing element senses the reflected wave, to differ from a visual field, in which the second sensing element senses the reflected wave.

According to one or more embodiments of the present invention, the radiation part radiates the exploring wave forward. According to one or more embodiments of the present invention, the exploring wave is a laser beam or a millimeter wave.

According to one or more embodiments of the present invention, the sensing part includes the first sensing element and the second sensing element, and the first sensing element and the second sensing element sense reflected wave of the exploring wave radiated by the radiation part.

According to one or more embodiments of the present invention, the determination part determines the rainfall state ahead based on the intensity of the reflected wave sensed by the first sensing element. The determination part also determines the existence or non-existence of the object positioned forward based on the intensity of the reflected wave sensed by the second sensing element.

According to one or more embodiments of the present invention, the visual-field restricting member is disposed in front of the first sensing element. The visual-field restricting member causes the visual field, in which the first sensing element senses the reflected wave, to differ from the visual field, in which the second sensing element senses the reflected wave. According to one or more embodiments of the present invention, the visual-field restricting member restricts the sensing visual fields of the first sensing element and the second sensing element such that the first sensing element senses the wave reflected from the raindrop in the surrounding range of tens of centimeters, and such that the second sensing element senses the wave reflected from the object positioned in the range of several meters to tens of meters. Thus, the first sensing element differs from the second sensing element in the object that reflects the sensed reflected wave.

According to one or more embodiments of the present invention, the visual-field restricting member restricts the sensing visual fields of the first sensing element and the second sensing element such that the first sensing element accurately senses the wave reflected from the raindrop and such that the second sensing element senses the wave reflected from the object positioned forward, so that the object positioned forward and the rainfall state can accurately be sensed.

The wave reflected from the raindrop may be extremely small compared to the wave reflected from the object. Therefore, according to one or more embodiments of the present invention, the visual-field restricting member restricts the visual field of the first sensing element to a visual field in which the wave reflected from a position closer to the radiation part than the visual field of the second sensing element is sensed.

According to one or more embodiments of the present invention, the visual-field restricting member forms a window in each of the first sensing element and the second sensing element, the reflected wave sensed by each of the first sensing element and the second sensing element passing through the window.

According to one or more embodiments of the present invention, the object positioned ahead and the rainfall state can accurately be sensed.

DETAILED DESCRIPTION

A radar device according to embodiments of the present invention will be described below. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
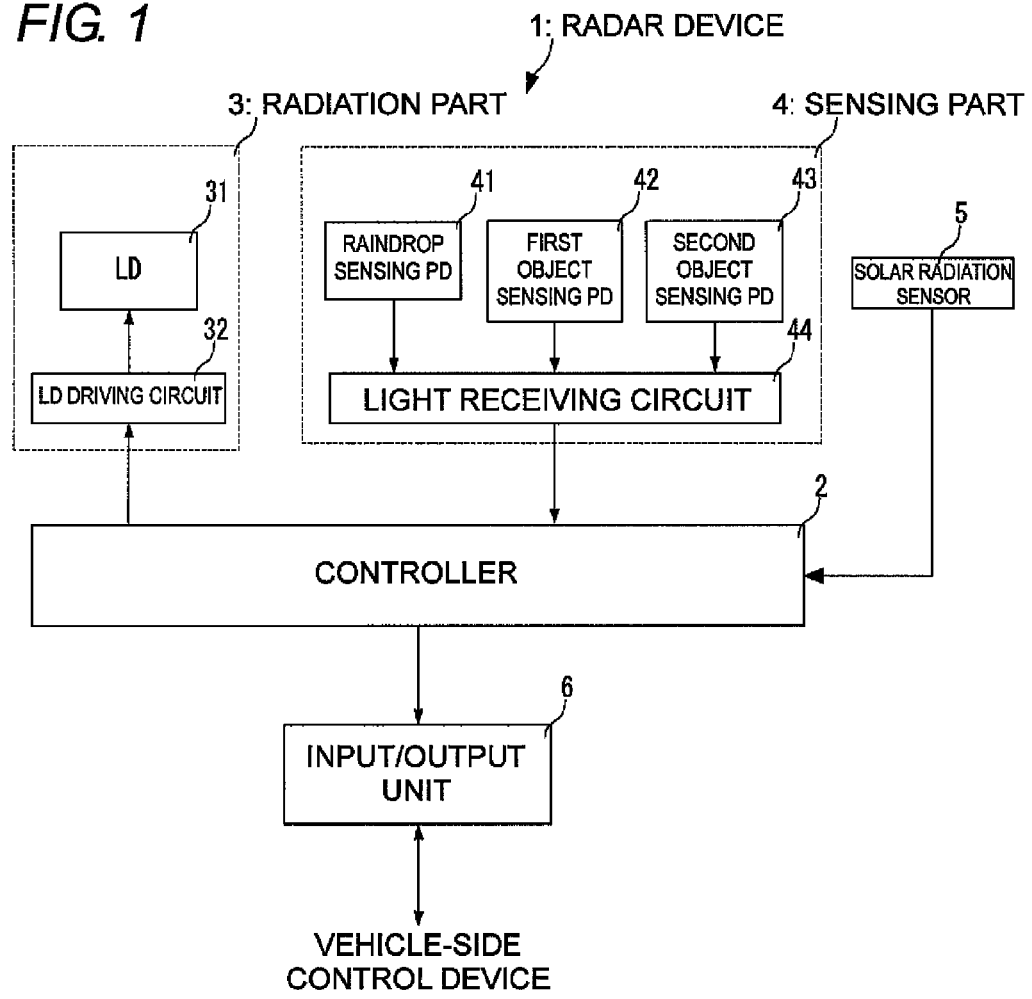
FIG. 1 is a block diagram illustrating a configuration of a main portion of a radar device according to one or more embodiments of the present invention.

FIG. 1 is a block diagram illustrating a configuration of a main portion of a radar device according to one or more embodiments of the present invention. A radar device 1 includes a controller 2, a radiation part 3, a sensing part 4, a solar radiation sensor 5, and an input/output unit 6. The radar device 1 is mounted on a vehicle. The radar device 1 radiates a laser beam in front of the vehicle, on which the radar device 1 is mounted, (hereinafter referred to as an own vehicle) as an exploring wave, and senses reflected light of the laser beam to sense an object positioned in front of the own vehicle. The radar device 1 also has a rainfall state sensing function of sensing the light, which is reflected from a raindrop around the own vehicle, to sense a rainfall state around the own vehicle.

The controller 2 controls an operation of each part of a main body of the radar device 1. The controller 2 has a function of the determination part according to one or more embodiments of the present invention.

The radiation part 3 includes a laser diode 31 (hereinafter referred to as an LD 31) and an LD driving circuit 32. In response to an instruction from the controller 2, the LD driving circuit 32 causes the LD 31 to emit the light to radiate the pulsed laser beam in front of the own vehicle.

The sensing part 4 includes a raindrop sensing photodiode 41 (hereinafter referred to as a raindrop sensing PD 41), a first object sensing photodiode 42 (hereinafter referred to as a first object sensing PD 42), a second object sensing photodiode 43 (hereinafter referred to as a second object sensing PD 43), and a light receiving circuit 44.

The raindrop sensing PD 41 corresponds to the first sensing element according to one or more embodiments of the present invention. According to one or more embodiments of the present invention, an APD (avalanche photodiode) is used as the raindrop sensing PD 41. The APD outputs a signal according to a light receiving amount in a region where the light receiving amount is relatively small.

The first object sensing PD 42 is a light receiving element in which a light receiving region is horizontally divided into n regions (in this case, ten regions). The second object sensing PD 43 is a light receiving element in which the light receiving region is not divided (one light receiving region). According to one or more embodiments of the present invention, a PIN photodiode is used as the first object sensing PD 42 and the second object sensing PD 43. The PIN photodiode outputs the signal according to the light receiving amount in a region where the light receiving amount is relatively large. Each of the divided regions of the first object sensing PD 42 receives the light reflected from a reflector (reflective plate), which is attached to both sides of a car positioned about 7 m to about 20 m ahead of the own vehicle. The second object sensing PD 43 receives the light reflected from objects, such as the car ahead, which is positioned within about 7 m ahead of the own vehicle.

One of the first object sensing PD 42 and the second object sensing PD 43 corresponds to a second sensing element according to one or more embodiments of the present invention.

The light receiving circuit 44 integrates and amplifies an output signal in each of the raindrop sensing PD 41, the first object sensing PD 42, and the second object sensing PD 43. For the first object sensing PD 42, the light receiving circuit 44 integrates and amplifies the output signal in each divided light receiving region.

The solar radiation sensor 5 senses a solar radiation amount.

For example, the input/output unit 6 outputs object sensing information indicating a position and the like (a relative position to the own vehicle) of the object, such as the detected car ahead, rainfall state sensing information indicating the rainfall state around the own vehicle, and solar radiation amount sensing information indicating the solar radiation amount around the own vehicle and the like to a control device (not illustrated) of the own vehicle. The input/output unit 6 receives an input of vehicle state information, such as a running speed of the own vehicle, from the control device of the own vehicle.

The control device of the own vehicle performs braking control, wiper control, light control, air conditioning control, and the like. In the braking control, the running speed of the vehicle is controlled based on the object sensing information inputted from the radar device 1. In the wiper control, operation/stop of a wiper is controlled based on the rainfall state sensing information. In the light control, lighting/light shut-off of a light of the own vehicle is controlled based on the solar radiation amount sensing information. In the air conditioning control, the operation of an automatic air conditioner is controlled.

Figure 2:
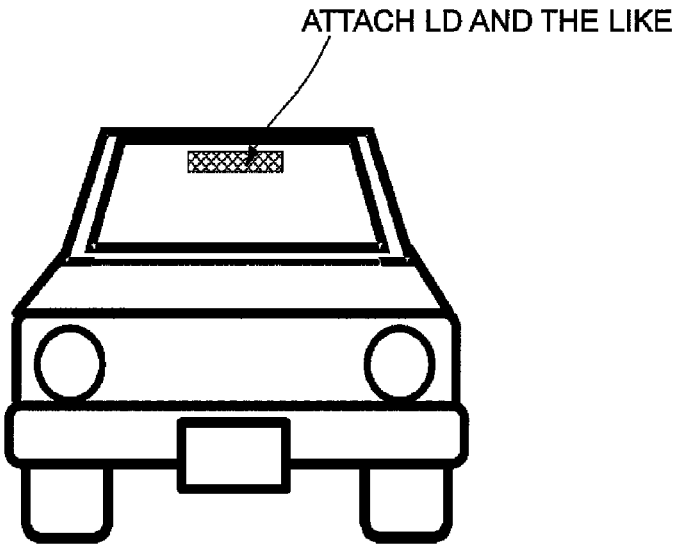
FIG. 2 is a view illustrating a position where an LD and a PD are attached to a vehicle according to one or more embodiments of the present invention.

In the radar device 1, for example, as illustrated in FIG. 2, the LD 31, the raindrop sensing PD 41, the first object sensing PD 42, and the second object sensing PD 43 are attached onto an in-car side of an upper portion of a windshield in the own vehicle.

Figure 3A:
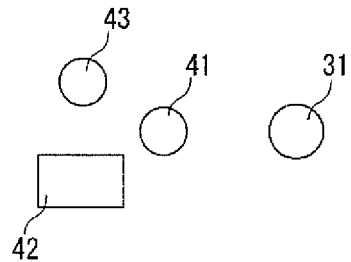
FIGS. 3A to 3D are views illustrating a disposition relationship between the LD and the PD according to one or more embodiments of the present invention.

FIG. 3A is a view illustrating a positional relationship among the LD, the raindrop sensing PD, the first object sensing PD, and the second object sensing PD. As illustrated in FIG. 3A, the raindrop sensing PD 41, the first object sensing PD 42, and the second object sensing PD 43 are gathered on one side with respect to the LD 31. The raindrop sensing PD 41, the first object sensing PD 42, and the second object sensing PD 43 are not divided into two sides while the LD 31 is interposed between the two sides. Therefore, a space necessary to dispose the LD 31, the raindrop sensing PD 41, the first object sensing PD 42, and the second object sensing PD 43 is suppressed to achieve downsizing.

The first object sensing PD 42 is disposed substantially immediately below the second object sensing PD 43. The raindrop sensing PD 41 is disposed closer to the side of the LD 31 than the first object sensing PD 42 and the second object sensing PD 43.

Figure 3B:
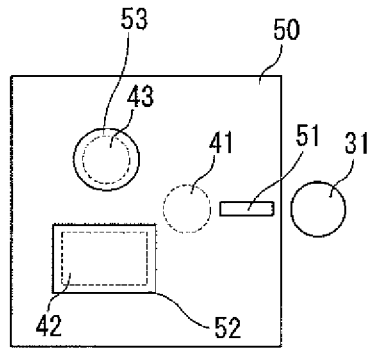
Figure 3C:
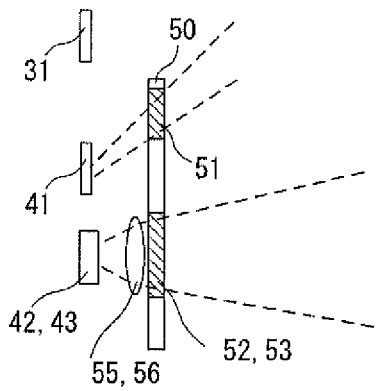
Figure 3D:
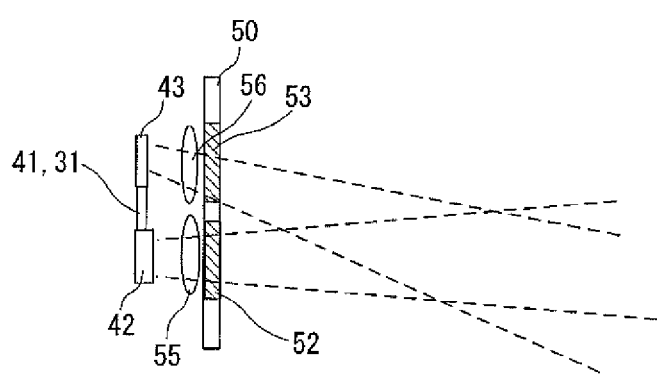

As illustrated in FIGS. 3B, 3C, and 3D, a visual-field restricting member 50 is disposed in front of the raindrop sensing PD 41, the first object sensing PD 42, and the second object sensing PD 43. FIG. 3B is a plan view of the visual-field restricting member 50 when the visual-field restricting member 50 is viewed from front. FIG. 3C is a plan view of the visual-field restricting member 50 when the visual-field restricting member 50 is viewed from above. FIG. 3D is a plan view of the visual-field restricting member 50 when the visual-field restricting member 50 is viewed from the side. In FIG. 3C, the first object sensing PD 42 and the second object sensing PD 43 are overlapped in a direction perpendicular to a paper plane. In FIG. 3D, the LD 31 and the raindrop sensing PD 41 are overlapped in the direction perpendicular to the paper plane.

Windows 51, 52, and 53 are formed in the visual-field restricting member 50. The visual-field restricting member 50 restricts a sensing visual field that receives the reflected light of the laser beam emitted from the LD 31 with respect to each of the raindrop sensing PD 41, the first object sensing PD 42, and the second object sensing PD 43.

The window 51 is formed into a horizontally long slit shape, and located at the substantially same level as the raindrop sensing PD 41. A center of the window 51 is horizontally deviated toward the side of the LD 31 with respect to the position facing the light receiving surface of the raindrop sensing PD 41. As illustrated in FIG. 3B, when viewed from the front, the window 51 and the light receiving surface of the raindrop sensing PD 41 are configured not to be overlapped with each other. The raindrop sensing PD 41 receives the light passing through the window 51. The sensing visual field of the raindrop sensing PD 41 is defined by the relationship between the light receiving surface of the raindrop sensing PD 41 and the window 51.

The center of the window 52 faces the center of the light receiving surface of the first object sensing PD 42. In FIGS. 3C and 3D, an imaging lens 55 forms an image on the light receiving surface of the first object sensing PD 42 using the reflected light that passes through the window 52 from the object. The sensing visual field of the first object sensing PD 42 is defined by a relationship between the light receiving surface of the first object sensing PD 42 and the imaging lens 55.

The center of the window 53 faces the center of the light receiving surface of the second object sensing PD 43. In FIGS. 3C and 3D, a collective lens 56 collects the reflected light, which passes through the window 52 from the object, to the light receiving surface of the second object sensing PD 43. The sensing visual field of the second object sensing PD 43 is defined by a relationship between the light receiving surface of the second object sensing PD 43 and the collective lens 56.

It is to be noted that in FIG. 3C, the collective lens 56 and the imaging lens 55 be overlapped in the direction perpendicular to the paper plane, and the window 52 and the window 53 are overlapped in the direction perpendicular to the paper plane. The window 51 located between the window 52 and the window 53 is not illustrated in FIG. 3C. The sensing visual fields of the raindrop sensing PD 41, the first object sensing PD 42, and the second object sensing PD 43 are indicated by broken lines in FIG. 3C. The sensing visual fields of the first object sensing PD 42 and the second object sensing PD 43 are indicated by broken lines in FIG. 3D. In FIG. 3D, the sensing visual field of the raindrop sensing PD 41 is omitted because the sensing visual field of the raindrop sensing PD 41 is overlapped with the sensing visual fields of the first object sensing PD 42 and the second object sensing PD 43 in the direction perpendicular to the paper plane.

A relationship between an irradiation region of the laser beam emitted from the LD 31 and the sensing visual fields, which receive the reflected light, of the raindrop sensing PD 41, the first object sensing PD 42, and the second object sensing PD 43 will be described below.

Figure 4A:
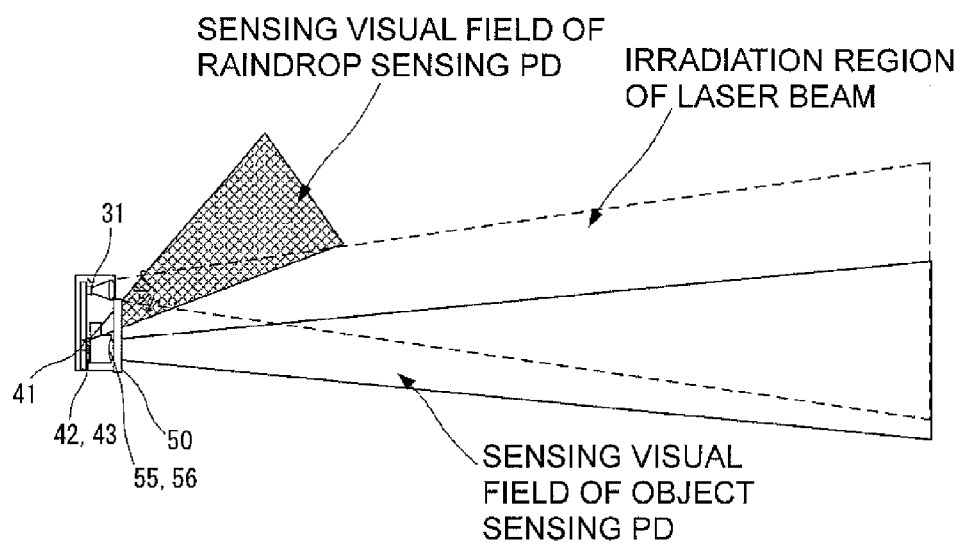
FIGS. 4A and 4B are views illustrating a relationship between an irradiation region of a laser beam and a sensing visual field of each light receiving element according to one or more embodiments of the present invention.
Figure 4B:
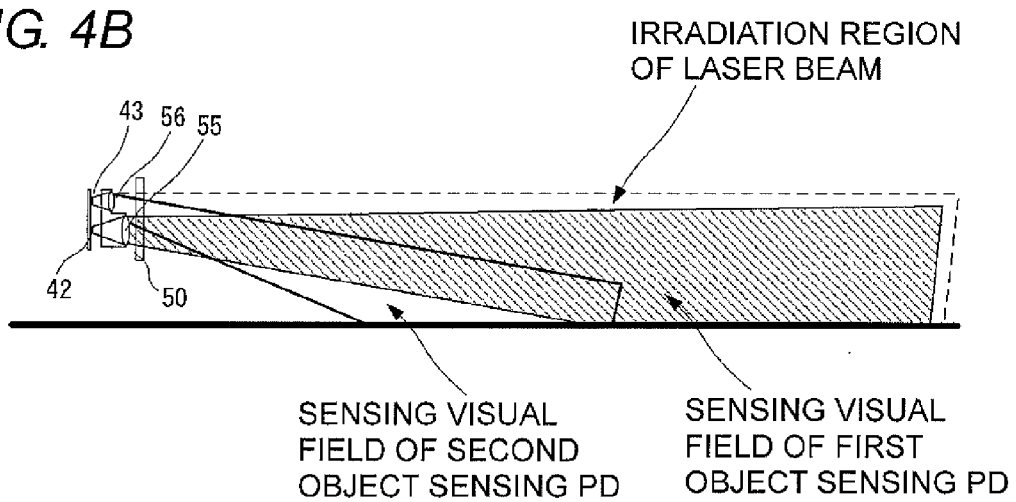

FIGS. 4A and 4B are views illustrating the relationship between an irradiation region of the laser beam of the LD and the sensing visual fields of the raindrop sensing PD, the first object sensing PD, and the second object sensing PD. FIG. 4A is a view in the horizontal direction, and FIG. 4B is a view in the vertical direction. A region indicated by a broken line in FIG. 4 is irradiated with the laser beam emitted from the LD 31 using a light projecting lens (not illustrated), which is disposed opposite the light emitting surface of the LD 31. For example, using the light projecting lens, the region is irradiated with the laser beam at a spread angle of 16° in the horizontal direction and 26° in the vertical direction. As illustrated in FIG. 4B, the light projecting lens spreads the laser beam downward while suppressing upward spread of the laser beam, whereby the light projecting lens suppresses the irradiation of display boards, such as a road traffic sign, which are placed above the road, with the laser beam (suppresses the reception of the light reflected from the display board placed above the road).

The sensing visual field of the raindrop sensing PD 41 is a hatched region in FIG. 4A. That is, the positional relationship between the light receiving surface of the raindrop sensing PD 41 and the window 51 of the visual-field restricting member 50 is set such that the hatched region in FIG. 4A becomes the sensing visual field of the raindrop sensing PD 41. According to one or more embodiments of the present invention, the light receiving surface of the raindrop sensing PD 41 is obliquely attached to the direction of the sensing visual field because the light receiving surface of the raindrop sensing PD 41 suppresses the reception of the light reflected from the front. The raindrop sensing PD 41 receives the light reflected from the raindrop in a region (hereinafter referred to as a raindrop sensing region) where the sensing visual field of the raindrop sensing PD 41 and the irradiation region of the laser beam of the LD 31 are overlapped with each other. The visual-field restricting member 50 restricts the sensing visual field of the raindrop sensing PD 41 such that a space on a hood of the own vehicle becomes the raindrop sensing region.

As illustrated in FIG. 4A, the sensing visual fields of the first object sensing PD 42 and the second object sensing PD 43 are substantially overlapped in the horizontal direction. The second object sensing PD 43 senses objects, such as the vehicle, which are positioned closer than the first object sensing PD 42. Therefore, as illustrated in FIG. 4B, the sensing visual field of the second object sensing PD 43 is oriented downward compared with the sensing visual field of the first object sensing PD 42. The hatched region in FIG. 4B is the sensing visual field of the first object sensing PD 42, and the region surrounded by a solid line is the sensing visual field of the second object sensing PD 43.

In FIG. 4B, the sensing visual field of the raindrop sensing PD 41 is omitted because the sensing visual field of the raindrop sensing PD 41 is overlapped with the sensing visual fields of the first object sensing PD 42 and the second object sensing PD 43 in the direction perpendicular to the paper plane.

The positional relationship between the light receiving surface of the first object sensing PD 42 and the imaging lens 55 is set such that the sensing visual field of the first object sensing PD 42 becomes the region in FIGS. 4A and 4B. For example, the sensing visual field of the first object sensing PD 42 is spread at an angle of 13° in the horizontal direction and 12° in the vertical direction. The positional relationship between the light receiving surface of the second object sensing PD 43 and the collective lens 56 is set such that the sensing visual field of the second object sensing PD 43 becomes the region in FIGS. 4A and 4B. For example, the sensing visual field of the second object sensing PD 43 is spread at an angle of 13° in the horizontal direction and 10° in the vertical direction.

The first object sensing PD 42 receives the light reflected from the object in a region (hereinafter referred to as a first object sensing region) where the sensing visual field of the first object sensing PD 42 and the irradiation region of the laser beam of the LD 31 are overlapped with each other. The second object sensing PD 43 receives the light reflected from the object in a region (hereinafter referred to as a second object sensing region) where the sensing visual field of the second object sensing PD 43 and the irradiation region of the laser beam of the LD 31 are overlapped with each other.

As illustrated in FIGS. 4A and 4B, the first object sensing region and the second object sensing region are partially overlapped with each other. On the other hand, the raindrop sensing region is not overlapped with each of the first object sensing region and the second object sensing region.

Here, sensing of the object with the raindrop sensing PD 41, the first object sensing PD 42, and the second object sensing PD 43 will be described below. As described above, the LD 31 radiates the laser beam having a predetermined pulse width forward.

As described above, the raindrop sensing region is the space on the hood of the own vehicle. Accordingly, the reflected light received by the raindrop sensing PD 41 is the light, in which the laser beam emitted from the LD 31 is reflected from the raindrop in the raindrop sensing region. The amount of reflected light received by the raindrop sensing PD 41 is increased because the number of raindrops is increased with increasing rainfall amount around the own vehicle. The controller 2 determines one of non-existence of the rainfall, a small amount of rainfall, a middle amount of rainfall, and a large amount of rainfall based on the mount of light reflected from the raindrop, which is received by the raindrop sensing PD 41. A determination result of the rainfall state in the controller 2 is outputted from the input/output unit 6 to the control device (not illustrated) of the own vehicle.

Thus, the raindrop sensing PD 41 accurately senses the light reflected from the raindrop around the own vehicle using the visual-field restricting member 50, so that the rainfall state can accurately be sensed around the own vehicle.

Figure 5A:
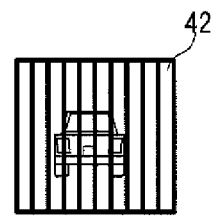
FIGS. 5A to 5C are schematic diagrams illustrating a car ahead in which an image is formed on a light receiving surface of a first object sensing PD and an acceptance light amount of each light receiving region depending on a distance to the car ahead, according to one or more embodiments of the present invention.
Figure 5B:
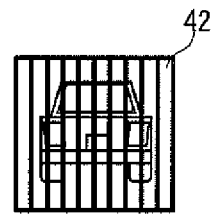
Figure 5C:
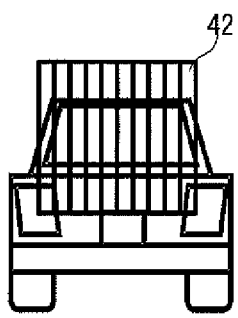
Figure 5C:
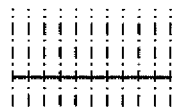

Next, sensing of the object with the first object sensing PD 42 will be described below. FIGS. 5A to 5C are schematic diagrams illustrating the car ahead in which an image is formed on the light receiving surface of the first object sensing PD and an acceptance light amount of each light receiving region depending on the distance to the car ahead. The distance to the car ahead is about 20 m in FIG. 5A, the distance to the car ahead is about 10 m in FIG. 5B, and the distance to the car ahead is about 3 m in FIG. 5C.

As illustrated in FIG. 5A, for the long distance to the car ahead, the image of the entire car ahead is formed on the light receiving surface of the first object sensing PD 42. The LD 31 radiates the laser beam having the predetermined pulse width forward. For the long distance to the car ahead, the entire car ahead is irradiated with the laser beam emitted from the LD 31, and the first object sensing PD 42 can receive the light reflected from the car ahead. As illustrated in FIGS. 5A and 5B, the light reflected from the reflectors attached to both the sides of the car ahead is received in the region where the acceptance light amount is large in the light receiving region of the first object sensing PD 42.

The controller 2 calculates a distance D to the car ahead by $$D = (t2 - t1) \times c/2 \text{ (where } c \text{ is a light speed)}$$

using a clock time t1 when the LD 31 emits the laser beam and a clock time t2 when the first object sensing PD 42 receives the reflected light.

The controller 2 calculates a horizontal position X of the object with respect to the own vehicle in each of the divided light receiving regions (ten light receiving regions) of the first object sensing PD 42 that receives the reflected light by $$X = \alpha \times D \tan \theta \text{ (where } \theta \text{ is the spread angle in the horizontal direction of the sensing visual field of the first object sensing PD 42)}$$

using coefficients α (α1 to α10) that are previously fixed with respect to the light receiving regions of the first object sensing PD 42.

The coefficients α (α1 to α10) that are previously fixed with respect to the light receiving region of the first object sensing PD 42 may be fixed based on the relatively positional relationship between the irradiation region of the laser beam of the LD 31 and the sensing visual field of the first object sensing PD 42.

Accordingly, the radar device 1 senses the distance to the object positioned in front of the own vehicle and the horizontal position of the object without horizontally scanning the laser beam emitted from the LD 31.

On the other hand, as illustrated in FIG. 5C, for the short distance to the car ahead, the image of the upper portion (surroundings of a rear window of the car ahead) of the car ahead is formed on the light receiving surface of the first object sensing PD 42. The rear window of the car ahead has a low reflectance to the laser beam emitted from the LD 31. Therefore, the first object sensing PD 42 cannot sense the light reflected from the rear window of the car ahead, and possibly the first object sensing PD 42 cannot sense the car ahead as the object.

However, as illustrated in FIG. 4B, because the sensing visual field of the second object sensing PD 43 is oriented downward compared with the sensing visual field of the first object sensing PD 42, the second object sensing PD 43 receives the light reflected from the reflector of the car ahead for the short distance to the car ahead. The controller 2 calculates the distance D to the car ahead by $$D = (t3 - t1) \times c/2 \text{ (where } c \text{ is the light speed)}$$

using the clock time t1 when the LD 31 emits the laser beam and a clock time t3 when the second object sensing PD 43 receives the reflected light.

Accordingly, even for the short distance to the car ahead, the radar device 1 senses the distance to the car ahead by receiving the reflected light using the second object sensing PD 43.

As described above, the radar device 1 can accurately sense the light reflected from the raindrop around the own vehicle using the raindrop sensing PD 41, and also accurately sense objects, such as the car ahead, which are positioned in front of the own vehicle, using the first object sensing PD 42 and the second object sensing PD 43.

In one or more embodiments of the present invention, by way of example, the laser beam is used as the exploring wave. However, the exploring wave is not limited to the laser beam. For example, a millimeter wave may be used as the exploring wave.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An object sensing device comprising:
   a radiation part that radiates an exploring wave forward;
   a sensing part having a first sensing element and a second sensing element, wherein the first sensing element and the second sensing element sense a reflected wave of the exploring wave radiated by the radiation part; and
   a determination part,
   wherein the determination part determines a rainfall state ahead based on an intensity of the reflected wave sensed by the first sensing element,
   wherein the determination part determines existence or non-existence of an object positioned forward based on an intensity of the reflected wave sensed by the second sensing element,
   wherein a visual-field restricting member is disposed in front of the first sensing element,
   wherein the visual-field restricting member restricts a first sensing visual field of the first sensing element and the second sensing visual field of the second sensing element, by causing the first sensing visual field, in which the first sensing element senses the reflected wave, to differ from the second sensing visual field, in which the second sensing element senses the reflected wave, and
   wherein the visual-field restricting member blocks reflected wave from the second sensing visual field of the second sensing element from reaching the first sensing visual field of the first sensing element.

2. The object sensing device according to claim 1, wherein the visual-field restricting member restricts the first sensing visual field of the first sensing element to a visual field in which the wave reflected from a position closer to the radiation part than the second sensing visual field of the second sensing element is sensed.

3. The object sensing device according to claim 1,
   wherein the visual-field restricting member forms a window in each of the first sensing element and the second sensing element, and
   wherein the reflected wave sensed by each of the first sensing element and the second sensing element passes through the window.

4. The object sensing device according to claim 2,
   wherein the visual-field restricting member forms a window in each of the first sensing element and the second sensing element, and
   wherein the reflected wave sensed by each of the first sensing element and the second sensing element passes through the window.

* * * * *